United States Patent Office 2,803,984
Patented Aug. 27, 1957

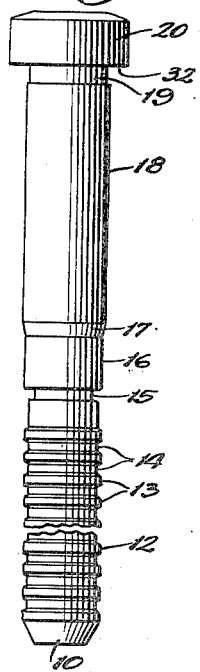
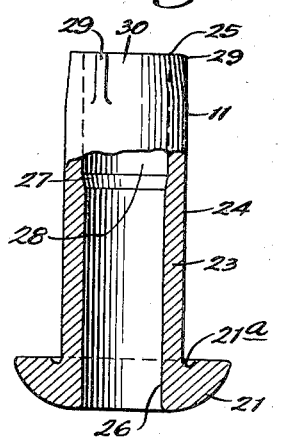
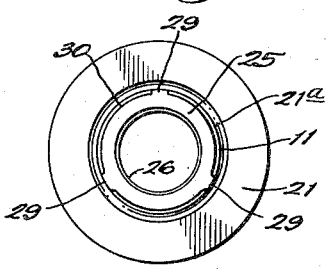
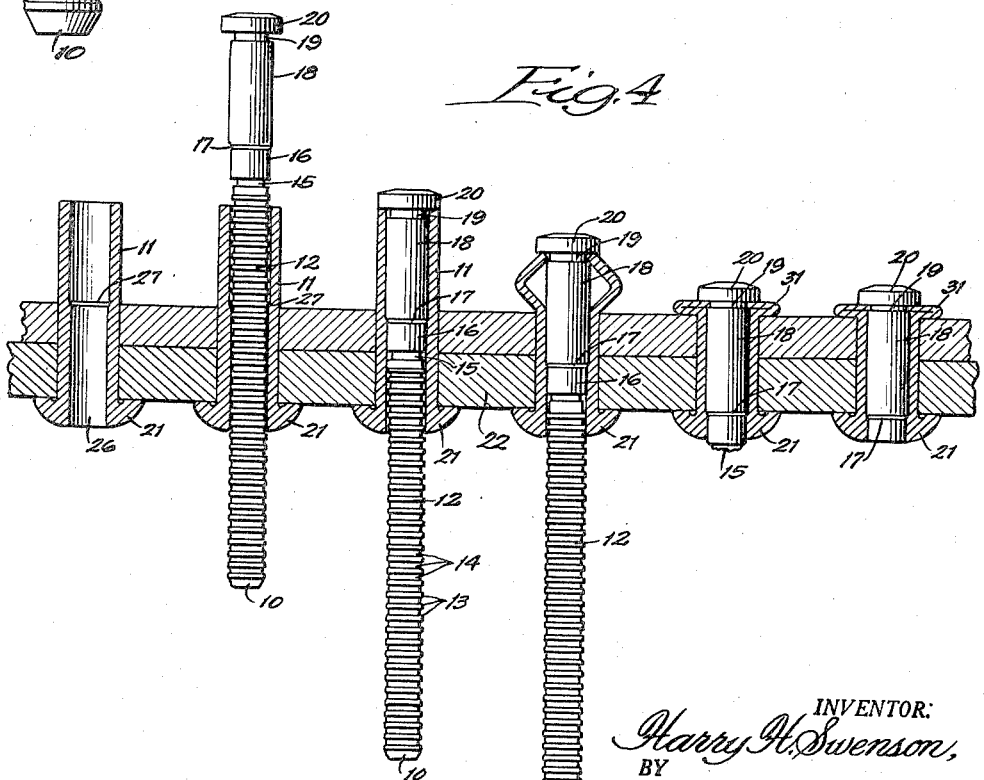

2,803,984
BLIND RIVET HAVING LONGITUDINALLY RIBBED AND HARDENED SLEEVE END

Harry H. Swenson, Amityville, N. Y.

Application March 9, 1954, Serial No. 414,981

1 Claim. (Cl. 85—40)

This invention relates to fasteners of the type usually referred to as blind rivets, and more particularly to an improvement which increases the pin retention ability of the structure.

Fasteners known as blind rivets, comprising a threaded and headed pin member adapted for coaxial movement relative to a sleeve member so as to produce a head on that sleeve member are old. Much effort has been applied to solving the problem of poor pin retention in structures of this character. It is extremely important, where the blind rivet is to be utilized as a permanent fastener rather than a temporary or tacking fastener, that the pin be retained in the sleeve in the position attained at the time of the break-off. Having the pin so retained obviously strengthens the joint made by the blind rivet fastener device and incorporates other advantages, such as closing an aperture through which dirt and foreign materials could enter the structure.

Various steps have been taken to provide improved pin retention, but excessive cost in the manufacture of the structure or in the labor involved in testing such a structure appears to grow at a rate commensurate with the effectiveness of the increased pin retention means. These structures include various types of ringed deflecting means positioned adjacent the head end of the pin and means for swaging a retainer into annular grooves adjacent the head end of the sleeve structure.

It is therefore an object of this invention to provide a blind rivet having increased pin retention characteristics.

A further object is to provide a blind rivet in which the sleeve member is snap-locked into permanent engagement with the pin adjacent the head end of the latter.

A further object is to provide a blind rivet having a positive locking engagement between the pin and the sleeve of a character which will permit the setting and locking of the rivet in position by means of a hand-operated tool as well as the power-operated tools available usually at industrial plants.

Further objects and advantages in my invention will be apparent from a consideration of the following specification in connection with the accompanying drawings, in which, Figure 1 is a broken view in elevation of a rivet pin constructed according to the invention, Fig. 2 is a view partially in section and partially in elevation of a rivet sleeve constructed according to the invention, Fig. 3 is a plan view of one end of the sleeve shown in Fig. 2, and Fig. 4 is a view partially in section and partially in elevation of a number of these rivets, showing the steps by means of which the rivet is set to hold two plates together.

Referring more particularly to the drawings, the rivet comprises a pin 10 and a sleeve member 11. The pin 10 is formed with a long shank 12 threaded with the lands 13 and the grooves 14, to provide a gripping surface for cooperation with a rivet-setting tool, not shown.

The threaded portion 12 of the shank terminates with a break-neck groove 15 formed in the metal of the pin to provide a weak point at which the pin will break under tension.

Immediately beyond the break-neck groove 15 there is formed a smooth cylindrical shank portion 16 which terminates at a setting shoulder 17 which fades into a smooth shank 18. The setting shoulder 17, as shown in all of the figures herein, is greatly exaggerated for purposes of emphasis. In actual rivet construction, the shank 18 should exceed the shank 16 in diameter by about two-thousandths of an inch. The setting shoulder 17 fades between the shanks 16 and 18 to an almost imperceptible increase in diameter.

Above the shank 18 the pin 10 is formed with an annular channel 19 of smaller diameter than the diameter of the shank 18. The channel 19 is formed of a sufficient width and depth to receive in snap-lock engagement the end of the sleeve 11.

The pin 10 is formed with a second head 20 at the far end thereof, the head being equal in diameter to the outside diameter of the sleeve with which it is used.

The sleeve 11 is formed with an outside head 21 adapted to abut the plate 22 in a sealing and fastening engagement. It is formed with an annular channel 21a which facilitates the distortion of the head 21 into a flush engagement with the plate 22. The cylindrical portion 23 of the sleeve 11 is formed with a uniform outside wall 24 extending from a point adjacent the channel 21a to the inside end 25. The inside of the tube 11 is formed with an initial cylinder 26 having a diameter in the order of two thousandths of an inch less than the outside diameter of the lands 13 on the pin 10. The cylindrical area 26 fades at the tapered portion 27 into the larger diameter 28. The portion 27 is located a distance from the head 21 at least equal to the combined thickness of the plates 22. The diameter of the portion 28 is preferably formed about two thousandths of an inch smaller than the diameter of the shank 18, thereby providing a commercial press fit which will retain the parts in their assembled condition prior to the setting of the rivet. This pin retention is exceedingly important in connection with positioning the rivet and holding it in a desired attitude while fitting the pulling tool onto the threaded end 12 of the pin 10.

The sleeve 11, as a finishing operation is cold worked to provide a plurality of ribs 29 interspersed between tapered longitudinal grooves 30. The sleeve 11 is placed on a mandrel which will retain the inside diameter of the cylindrical portion 28. The sleeve is then placed into a tool resembling the action of a power-operated collet having a plurality of jaws. The jaws of the collet are snapped shut on the sleeve 11 adjacent the inner end 25, thereby compressing the material in the grooves 30 while permitting the ribs 29 to stand up.

The purpose of the cold working of the sleeve 11 is to strengthen the inner end 25 so that the bulbing action during the setting of the rivet may be accurately controlled to produce the snap-lock action required. It has been determined that the length of the rib 29 controls the length of the bell portion of the bulbing of the inner head 31. The end 25, under the urging of the head 20 and during the setting operation, remains tightly engaged adjacent the channel 19, and as the bulbing action takes place, as shown in Fig. 4, the end 25, in its flat plate ring aspect tends to be turned in to embrace the circumferential surface of the channel 19, rather than the under side 32 of the head 20. This turning of the inside end 25 of the sleeve 11 is accomplished in a snap-lock reaction late in the setting period, thereby providing a positive lock between the pin 10 and the sleeve 11. The positive locking action is further increased by reason of the work hardening which takes place on the end of the sleeve during the final manufacturing operation. To remove the grip of the sleeve upon the pin and its groove it is necessary to work against the additional resistance generated in this work hardened area. Ordinarily the additional strength incorporated into this area is such that the removal of the pin is accomplished by shearing the sleeve 11 midway between the head 21 and the head 31, rather than by snapping the lock out of the channel 19.

The snap-lock reaction accomplished by the sleeve 11 around the pin 10 is accomplished by the use of much less force than is required to accomplish the locking in which metal is swaged into annular grooves on the pin. This makes it possible to set this rivet with positive locking action by a tool of the hand-powered variety normally found in field installations, rather than requiring the operation of a power tool.

The length of the ribs 29, since it determines the area of the bulbing, can be varied to control the length of the bell which forms the head 31. The ribs 29 prevent the outward flaring of the tube 11 during the setting operation.

Having described my invention, what I desire to protect by United States Letters Patent and claim, is:

A blind rivet fastener, comprising a metal pin having a head formed at one end thereof and a cylindrical shank portion adjacent said head, said pin having an annular channel therein between said head and said shank, a metal sleeve for receiving said pin, said sleeve having a generally cylindrical body with inner and outer ends and a head formed on said outer end, said head of said pin being engageable with said inner end of said sleeve, said body of said sleeve having a plurality of angularly spaced longitudinal channel-shaped indentations formed in the outer surface thereof and extending from said inner end thereof a minor fraction of the distance toward said outer end thereof, said indentations defining ribs therebetween with outer surface elements substantially flush with the cylindrical outer surface of said body, said indentations being relatively substantially wider than said ribs and having bottom surfaces tapering radially toward said inner end of said sleeve, said body having wall portions underlying said indentations and of substantially greater density and hardness than the remainder of said body, said ribs and said wall portions resisting expansion of the inner end portion of said sleeve.

References Cited in the file of this patent

UNITED STATES PATENTS

| | | |
|---|---|---|
| 1,976,776 | Gookin | Oct. 16, 1934 |
| 2,030,167 | Miller | Feb. 11, 1936 |
| 2,061,629 | Huck | Nov. 24, 1936 |
| 2,114,493 | Huck | Apr. 19, 1938 |
| 2,343,143 | Gill | Feb. 29, 1944 |